United States Patent [19]

Bushnell

[11] Patent Number: 5,071,717
[45] Date of Patent: Dec. 10, 1991

[54] COATED CATHODE SUBSTRATE

[75] Inventor: Calvin L. Bushnell, Glastonbury, Conn.

[73] Assignee: International Fuel Cells Corporation, South Windsor, Conn.

[21] Appl. No.: 243,194

[22] Filed: Sep. 8, 1988

[51] Int. Cl.[5] .................. H01M 8/14; H01M 8/02
[52] U.S. Cl. .................................. 429/13; 429/16; 429/40; 429/44
[58] Field of Search ................ 429/16, 36, 35, 44, 429/40, 34, 13, 37, 38

[56] References Cited

U.S. PATENT DOCUMENTS

| | | | |
|---|---|---|---|
| 3,278,336 | 10/1966 | Uline et al. | 429/38 |
| 3,445,294 | 5/1969 | Leonard | 136/86 |
| 4,115,627 | 9/1978 | Christner et al. | 429/44 |
| 4,279,970 | 7/1981 | Breault et al. | 429/35 |
| 4,329,403 | 5/1982 | Baker | 429/35 |
| 4,361,631 | 11/1982 | Iacovangelo et al. | 429/40 |
| 4,374,185 | 2/1983 | Powers et al. | 429/36 |
| 4,397,917 | 8/1983 | Chi et al. | 429/26 |
| 4,411,968 | 10/1983 | Deiser et al. | 429/41 |
| 4,416,955 | 11/1983 | Chi | 429/26 |
| 4,591,538 | 5/1986 | Kunz | 429/16 |

OTHER PUBLICATIONS

McGraw-Hill Encyclopedia of Science and Technology-5th Edition 1982, pp. 397–400.

Primary Examiner—Donald L. Walton
Attorney, Agent, or Firm—Lloyd D. Doigan; Peter R. Ruzek

[57] ABSTRACT

Gaps occurring between a cathode substrate and a gas housing in a fuel cell interfere with electron transfer in the cell causing high cell internal resistance. To reduce the high resistance gaps are closed by coating the substrate with metal powder that expands during oxidation closing the gaps.

14 Claims, 1 Drawing Sheet

COATED CATHODE SUBSTRATE

DESCRIPTION

1. Technical Field

This invention relates to a layered cathode substrate for use in a fuel cell.

2. Background Art

Molten carbonate fuel cells are well known in the art and are described, for example, in U.S. Pat. Nos. 4,009,321 and 4,079,171. The electrolyte in this type of cell is solid at room temperature and is a molten liquid at operating temperatures which generally range between 500° C. and 750° C. Some well known electrolytes of this type are the alkali metal binary and ternary carbonate compositions consisting of lithium, potassium and sodium carbonates. The electrolyte is disposed within a substantially inert matrix sandwiched between a ribbed anode and a ribbed cathode electrode. In addition to having structural integrity, the matrix, in combination with the electrolyte, must provide complete separation of the fuel and oxidant gases disposed on opposite sides thereof.

Molten carbonate fuel cells that operate with metallic oxide cathode substrates typically have high cell internal resistance (IR). One reason higher fuel cell IR may occur is due to contact resistance caused by gaps formed between the tops of metallic oxide ribs formed on the cathode substrate and a cell gas housing or a separator plate between joined fuel cells. The gaps interfere with the required electron transfer in the cell.

The tops of the ribs and/or the fuel cell housing or separator plate may be slightly out of plane because of distortions that occur during manufacturing and good contact without gaps between the ribs and the housing typically cannot be made. Correcting this deficiency by requiring better controls and procedures in existing manufacturing methods is impractical and costly.

Accordingly, what is needed in the art is an improved cathode structure to reduce cell IR when the cathode structure is put in contact with a fuel cell gas housing or separator plate.

DISCLOSURE OF INVENTION

In accordance with this invention there is provided a cathode having a metallic oxide substrate with contact surfaces and a metallic powder coating the contact surfaces. The powder is retained on the contact surfaces to allow for ease of handling of the cathode during formation of the fuel cell. During the formation, start-up and running of the fuel cell, the coated contact surfaces abut a cell housing or a separator plate producing a cell with lower IR.

In accordance with this invention, there is provided an improved high temperature fuel cell having an anode, a metallic oxide cathode, a molten electrolyte sandwiched between the anode and cathode and a gas housing or separator plate enclosing the anode and cathode. The anode and cathode have ribbed surfaces for contacting the housing creating channels for reactant gases. The improvement involves coating a cathode contact surface with a powdered metal. Upon the assembly and start-up of the cell, the coated contact surface is placed in contact with the housing or plate to close gaps existing between the housing or plate and the contact surface.

In accordance with this invention, there is further provided a method for forming a fuel cell by coating a cathode substrate with a metallic powder, pressing the cathode structure against a fuel cell gas housing or separator plate at an elevated temperature and bringing the cell to an operating temperature.

Other objects, features and advantages of this invention will become apparent in light of the teachings and the following description of the invention and accompanying drawings.

BEST MODE FOR CARRYING OUT THE INVENTION

Figure 1:
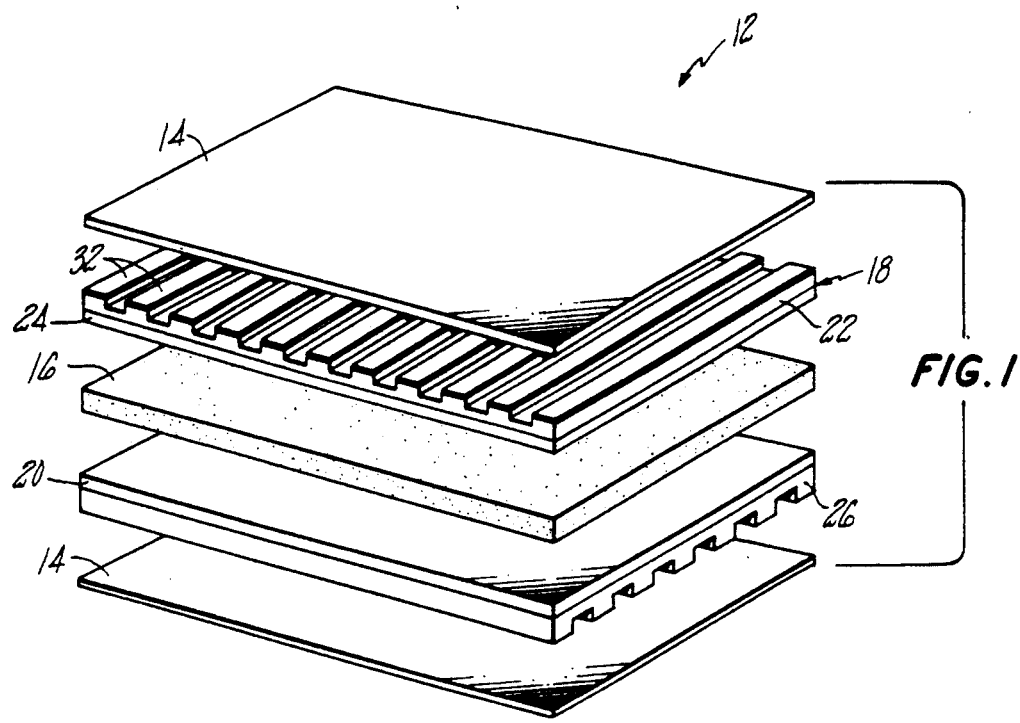
FIG. 1 is a side view illustrating one section of an overall fuel cell.

Referring to the drawings, the present invention is directed to a cathode 18 for a molten carbonate fuel cell 12 having a substrate with ribbed contact surfaces 22.

The molten cell includes an electrolyte retaining matrix 16 having a cathode electrode 18 disposed on one side thereof and an anode electrode 20 disposed on the other side thereof. The cathode electrode is comprised of a ribbed substrate 22 and a catalyst layer 24 disposed between substrate 22 and the adjoining side of matrix layer 16. Anode 20 is similar to cathode 18 to the extent that the former is comprised of its own ribbed substrate 26 and catalyst layer 28 disposed between the latter and the adjoining side of matrix layer 16. The electrochemical cells are separated from one another by flat gas impermeable separator plates 14 which may be made of any known method and of any material which is compatible with and can withstand the operating environment within the cell.

Figure 2:
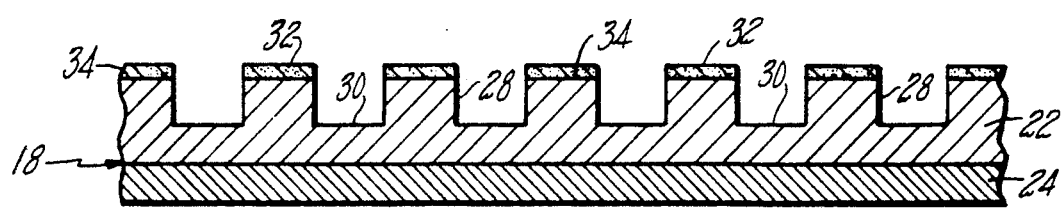
FIG. 2 is a side view of the cathode, its contact surfaces and its coating in accordance with the present invention.

Typically, the cathode substrate 22 as shown in FIG. 2 is constructed of a metallic oxide that is electrically conductive, compatible with a chosen cell electrolyte and resistant to creep. The metallic oxide may be a perovskite but nickel oxide is preferred. The substrate 22 is formed having on one side a flat backing for contact with a catalytic layer 24 and having raised parallel ribs 28 on its other side for contact with a cell gas housing or separator plate 14. Channels 30 are created between the ribs to introduce an oxidant allowing the cell to function and to finally form the cell. The housing 14 is preferably constructed of stock 300 series stainless steel.

A metallic powder 32 is coated on contact surfaces 34 of the cathode in an amount sufficient to close the gaps between the surfaces and the housing, as will be discussed infra. The metallic powder forms a continuous, uninterrupted layer upon the contact surfaces for the conductance of electrons from the cathode electrode to the cell gas housing or separator plate 14. Typically, the depth of the continuous layer of powder will range between 2 mils and 8 mils, with between 4 mils and 6 mils being preferred. A depth of 5 mils is ideal. If the depth of the continuous layer of powder is less than 2 mils, gaps caused by the distortions of the contact surfaces and the cell gas housing/separator plate may not closed upon oxidation of the metallic powder which leads to higher cell IR. The metallic powder 32 may be any metal that oxidizes and expands to close the gaps when a fuel cell reaches its operating temperature, but nickel is preferred. The nickel powder has a grain size of approximately 2 microns to 10 microns, but preferably is in the 3 micron to 5 micron range.

Several methods may be used to apply this layer of powder including curtain coating and doctor blades, brushing, spraying or plating. Screen printing, however, is used as a preferred method. A binder is used to enable the powder to coalesce and to adhere to the cathode contact surfaces 34. This enables the cathode 18 to be easily handled during shipping and during formation of the fuel cell 12. The binder typically volatilizes and decomposes upon heating the cell so as not to interfere with the oxidation and expansion of the powder. The binder may be of any polymer that decomposes at temperatures lower than fuel cell operating temperatures, but is preferably polyvinylbutyral (Monsanto Butvar B98).

The binder is mixed to form a slurry having a weight of between 8% to 15% polymer with 12% being preferred, the balance of the slurry being the nickel powder. The binder provides handleability, flexibility, and conformability.

Various plasticizers and other modifiers such as flow control agents can be added to the polymer for application purposes. The materials are preferably mixed in a ball mill with organic solvents such as chlorinated hydrocarbons and alcohol. Chlorinated hydrocarbons and alcohols have been found to be the preferred organic solvents for proper drying and flow control of the mix during application. Alcohols such as ethanol and butanol mixed with chlorinated hydrocarbons such as perchloroethylene have been found to provide suitable flow properties to the slurry. A slurry viscosity in the range of 800–1200 cps is preferred for casting layers, either by doctor-blade or curtain coater. Other conventional materials are added to aid mixing, casting, and final slurry properties. A deflocculant such as crude menhaden fish-oil aids in flexibility. An anitfoaming agent like Dow Antifoam-A aids in the escape of trapped gas bubbles during drying.

Entrapment of gas-bubbles in the slurry requires their removal before drying. To aid this, drying must be retarded by use of solvents with lower vapor pressure, like butanol, or more effectively, by holding the freshly-cast mix in an atmosphere saturated with solvent vapors. Typically, a 15 minute delay before drying will allow bubbles to escape. The use of an antifoam agent aids the breaking and release of the bubbles. If the solvent vapor treatment is utilized to remove entrapped gas bubbles before drying, any of the above-cited chlorinated hydrocarbon or alcohol solvents can be used, although the use of an azeotropic mixture of perchloroethylene and ethanol is preferred. Treatment time should be sufficient to remove the bubbles; in most instances, times of at least five minutes being required.

After the cathode 18 has been coated with the metallic powder 32, the fuel cell is constructed by pressing the cathode substrate contact surfaces 34 and the dried slurry against the housing 14 under pressure of about 40 pounds per square inch to 60 pounds per square inch but preferably at 50 pounds per square inch and raising the temperature from about 150° F. to 250° F. but preferably 200° F. The increased temperature and pressure provide conformity in the electrical contact.

The cell is then brought to its operating temperature by introducing the oxidant and fuel gases to the cell. The temperature increase and oxidant serve to oxidize and expand the powder, closing the gaps between the housing and the cathode, providing low cell IR. The initial heating of the cathode and housing along with bringing the cell to operating temperature volatilizes the binder, decomposing and stripping it away from the powder to allow for oxidation and the concomitant expansion of the powder. Thus the expansion of the nickel powder allows that powder to conform to the irregularities of the surfaces of the cathode substrate and the housing producing more intimate contact, closing spaces that might otherwise interfere with required electron transfer.

Accordingly, what is shown in light of the teachings in the description is an improved, easily handled, coated cathode substrate to close gaps that cause higher IR in fuel cells.

Although this invention has been shown and described with respect to detailed embodiments thereof, it will be understood by those skilled in the art that various changes in form and detail thereof may be made without departing from the spirit and scope of the claimed invention.

We claim:

1. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains which expand when oxidized, and which are coated onto said substrate contact surface and oxidized in situ after said fuel cell assembly has been assembled; said precursor mixture being of a thickness of 5 mils and having a grain size of about 3 microns to 5 microns, said grain size ensuring that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

2. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidized in situ after said fuel cell assembly has been assembled; said precursor mixture being of a thickness and grain size so as to ensure that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

3. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidized in situ after said fuel cell assembly has been assembled; said precursor mixture being of a thickness of between 2 mils and 8 mils and grain size so as to ensure that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

4. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidize in situ after said fuel cell assembly has been assembled; said precursor mixture being of a thickness of between 4 mils and 6 mils and grain size so as to ensure that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

5. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidize in situ after said fuel cell assembly has been assembled; said precursor mixture being of a thickness of 5 mils and grain size so as to ensure that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

6. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidize in situ after said fuel cell assembly has been assembled; said precursor mixture being of a thickness of between 2 mils and 8 mils and having a grain size of about 2 microns to 10 microns, said grain size ensuring that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

7. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidize in situ after said fuel cell assembly has been assembled; said precursor mixture being of a thickness of between 2 mils and 8 mils and having a grain size of about 3 microns to 5 microns, said grain size ensuring that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

8. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidized in situ after said fuel cell assembly has been assembled; said precursor mixture being of a thickness of between 4 mils and 6 mils and having a grain size of about 2 microns to 10 microns, said grain size ensuring that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

9. A fuel cell assembly of the type which operates at temperatures to excess of about 500° C., said assembly comprising:

an electrolyte matrix layer;

an anode electrode disposed on one side of said matrix layer, said anode electrode including an anode substrate and an anode catalyst layer sandwiched between said anode substrate and said matrix layer;

a cathode electrode disposed on an opposite side of said matrix layer, said cathode electrode including a cathode substrate, and a cathode catalyst layer sandwiched between said cathode substrate and said matrix layer; said cathode substrate including an electron flow contact surface for conducting electrons from said cathode electrode;

a conductor/separator plate adjacent to said cathode substrate contact surface and operable to conduct electrons from said cathode; and a continuous and uninterrupted bridge layer of a conductive metallic oxide interconnecting said cathode substrate contact surface and said conductor/separator plate, said metallic oxide layer being formed from a precursor mixture of powder metal grains, which expand when oxidized, and which are coated onto said substrate contact surface and oxidized in situ after said fuel cell assembly has been assembled; said precursor mixture being of a thickness of 5 mils and having a grain size of about 2 microns to 10 microns, said grain size ensuring that expansion of said powder metal grains upon oxidation will eliminate essentially all gaps between the cathode substrate contact surface and the conductor/separator plate thereby providing low internal resistance transfer of electrons between said cathode substrate and said conductor/separator plate through said layer.

10. Method for closing gaps between an cathode electrode, said cathode electrode having electron flow contact surface for conducting electrons from said cathode electrode, and a conductor/separator plate in a fuel cell assembly of the type which operates at temperatures to excess of about 500° C., said method comprising:

coating said contact surface with a continuous and uninterrupted bridge layer of a conductive metallic oxide, said metallic oxide layer being formed from a precursor mixture of powder metal grains which expand when oxidized, pressing said cathode electrode having a coated contact surface against said conductor/separator plate at a pressure of between about 40 pounds per square inch to about 60 pounds per square inch at a temperature between 150° F. and 250° F., introducing an oxidant into said fuel cell assembly to bring said fuel cell assembly to operating temperature and to cause the oxidation of and a concomitant expansion of said bridge layer of metallic oxide, said expansion of said powder closing gaps between said contact surface and said conductor/separator plate.

11. Method for closing gaps between an cathode electrode, said cathode electrode having electron flow contact surface for conducting electrons from said cathode electrode, and a conductor/separator plate in a fuel cell assembly of the type which operates at temperatures to excess of about 500° C., said method comprising:

coating said contact surface with a continuous and uninterrupted bridge layer of a conductive metallic oxide, said metallic oxide layer being formed from a precursor mixture of powder metal grains which expand when oxidized, pressing said cathode electrode having a coated contact surface against said conductor/separator plate at a pressure of between about 40 pounds per square inch to about 60 pounds per square inch at an elevated temperature, introducing an oxidant into said fuel cell assembly to bring said fuel cell assembly to operating temperature and to cause the oxidation of and a concomitant expansion of said bridge layer of metallic oxide, said expansion of said powder closing gaps between said contact surface and said conductor/separator plate.

12. Method for closing gaps between an cathode electrode, said cathode electrode having electron flow contact surface for conducting electrons from said cathode electrode, and a conductor/separator plate in a fuel cell assembly of the type which operates at temperatures to excess of about 500° C., said method comprising:

coating said contact surface with a continuous and uninterrupted bridge layer of a conductive metallic oxide of between 2 mils and 8 mils thick, said metallic oxide layer being formed from a precursor mixture of powder metal grains which expand when oxidized, pressing said cathode electrode having a coated contact surface against said conductor/separator plate at a pressure of between about 40 pounds per square inch to about 60 pounds per square inch at a temperature between 150° F. and 250° F., introducing an oxidant into said fuel cell assembly to bring said fuel cell assembly to operating temperature and to cause the oxidation of and a concomitant expansion of said bridge layer of metallic oxide, said expansion of said powder closing gaps between said contact surface and said conductor/separator plate.

13. Method for closing gaps between an cathode electrode, said cathode electrode having electron flow contact surface for conducting electrons from said cathode electrode, and a conductor/separator plate in a fuel cell assembly of the type which operates at temperatures to excess of about 500° C., said method comprising:

coating said contact surface with a continuous and uninterrupted bridge layer of a conductive metallic oxide between 4 mils and 6 mils thick, said metallic oxide layer being formed from a precursor mixture of powder metal grains which expand when oxidized, pressing said cathode electrode having a coated contact surface against said conductor/separator plate a pressure of between about 40 pounds per square inch to about 60 pounds per square inch at an elevated temperature, introducing an oxidant into said fuel cell assembly to bring said fuel cell assembly to operating temperature and to cause the oxidation of and a concomitant expansion of said bridge layer of metallic oxide, said expansion of said powder closing gaps between said contact surface and said conductor/separator plate.

14. Method for closing gaps between an cathode electrode, said cathode electrode having electron flow contact surface for conducting electrons from said cathode electrode, and a conductor/separator plate in a fuel cell assembly of the type which operates at temperatures to excess of about 500° C., said method comprising:

coating said contact surface with a continuous and uninterrupted bridge layer of a conductive metallic oxide of between 4 mils and 6 mils thick, said metallic oxide layer being formed from a precursor mixture of powder metal grains which expand when oxidized, pressing said cathode electrode having a coated contact surface against said conductor/separator plate at a pressure of between about 40 pounds per square inch to about 60 pounds per square inch at a temperature between 150° F., and 250° F., introducing an oxidant into said fuel cell assembly to being said fuel cell assembly to operating temperature and to cause the oxidation of and a concomitant expansion of said bridge layer of metallic oxide, said expansion of said powder closing gaps between said contact surface and said conductor/separator plate.

* * * * *